(Model.) 2 Sheets—Sheet 1.
C. REUTER.
EGG TESTER.
No. 380,518. Patented Apr. 3, 1888.
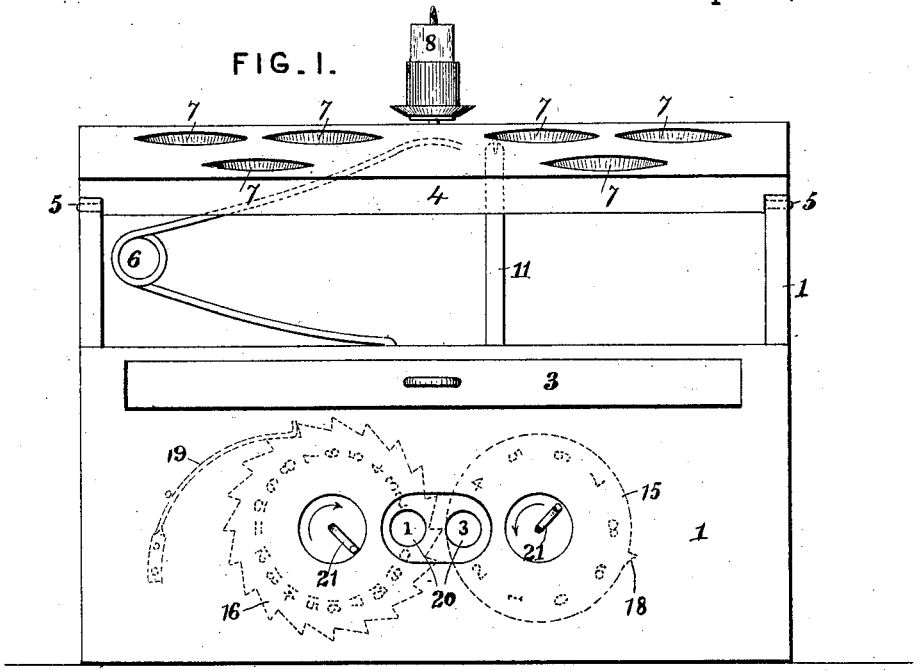
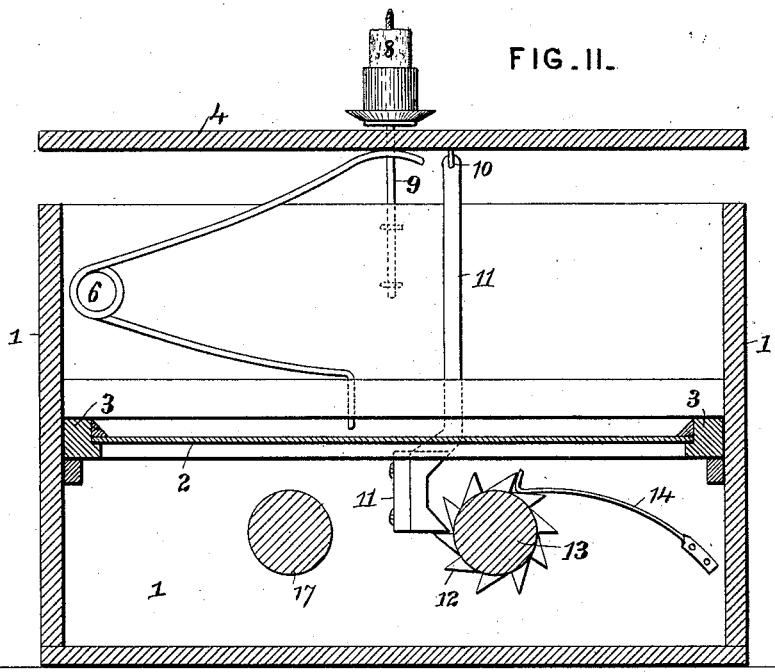
Attest
Geo. T. Smallwood.
Geo. L. Wheelock.
Inventor:
Conrad Reuter:
By Knight Bros
Attys
N. PETERS, Photo-Lithographer, Washington, D. C.

(Model.) 2 Sheets—Sheet 2.
C. REUTER.
EGG TESTER.
No. 380,518. Patented Apr. 3, 1888.
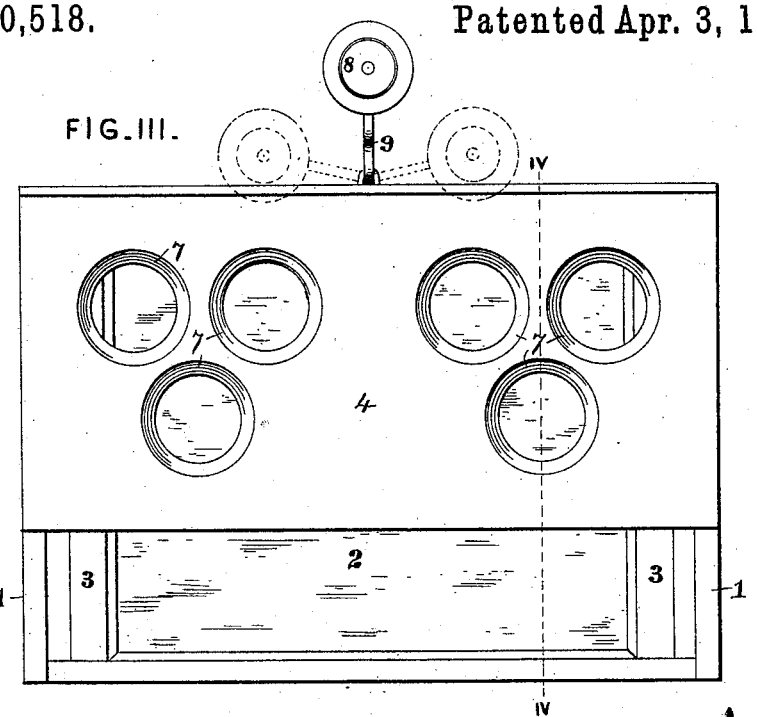
FIG. III.
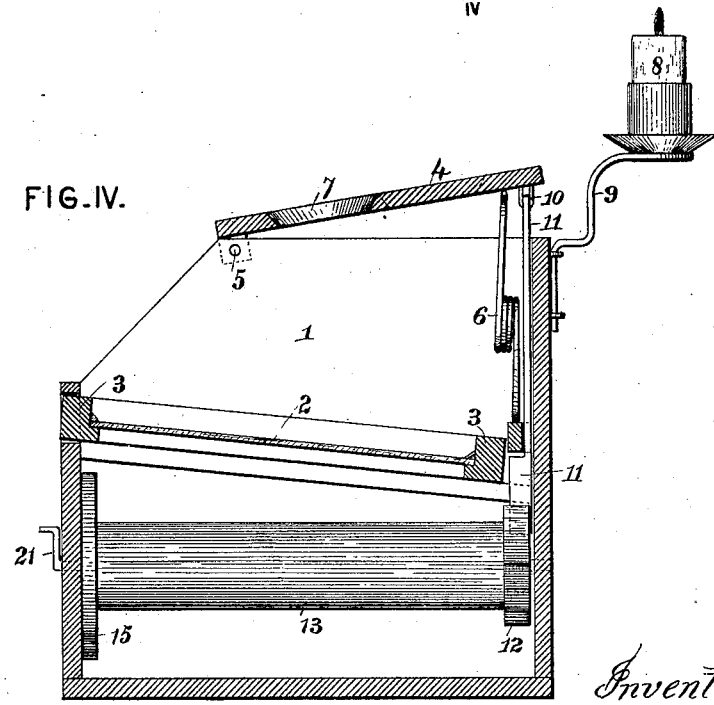
FIG. IV.
Attest:
Geo. T. Smallwood,
Geo. L. Wheelock.
Inventor:
Conrad Reuter.
By Knight Bros.
Attys

UNITED STATES PATENT OFFICE.

CONRAD REUTER, OF HENDERSON, KENTUCKY.

EGG-TESTER.

SPECIFICATION forming part of Letters Patent No. 380,518, dated April 3, 1888.

Application filed October 23, 1885. Serial No. 180,739. (Model.)

*To all whom it may concern:*

Be it known that I, CONRAD REUTER, a citizen of the United States, residing at Henderson, in the county of Henderson and State of Kentucky, have invented a new and useful Improvement in Egg Testers and Counters, of which the following is a specification.

My invention relates to certain modifications in forms of instruments for testing and counting eggs, whereby both of these operations are performed at the same time, the arrangement being such that the placing of two handfuls of eggs upon the testing-table will automatically indicate on the register the number of eggs or the number of handfuls of eggs which have been tested.

In order that the invention may be better understood, I will proceed to describe it with reference to the accompanying drawings, in which—

Figure I is a front elevation of my improved egg tester and counter, and Fig. II a vertical sectional view of the same. Fig. III is a plan view, and Fig. IV a transverse section.

The box or frame 1 supports a mirror, 2, in a sliding frame, 3, so arranged that the mirror may be withdrawn when required for cleaning or for inspection of the parts beneath. The top 4 is pivoted at front in the sides of the box or frame, as shown at 5, and is kept in an elevated position at rear by a spring, 6. The upper side of the top 4 is provided with six seats, 7, for two handfuls of eggs which are to be tested. A candle or lamp, 8, is mounted in a swinging bracket, 9, so arranged that it may be thrown to one side or the other to throw the light onto either handful of eggs. This movable support for the light is absolutely essential where the seats for the eggs are so arranged that light coming from a single point would cause one egg to cast a shadow upon another egg beyond it, for the reason that the shadowed egg would have the appearance of being bad. Pivoted at 10 to the upper side of the top 4 is a pendent dog, 11, arranged to be thrown by gravity or spring against a ratchet-wheel, 12, on a cylinder or shaft, 13. A spring, 14, prevents the rearward rotation of ratchet-wheel 12. At its forward end the shaft 13 carries a disk, 15, (see dotted lines, Fig. I,) whereon are series of figures for indicating units. A second register-wheel, 16, for indicating tens is supported on a shaft or pin, 17, and is forced forward one tooth by the projection 18 on disk 15 at each revolution of said disk. A spring, 19, serves to prevent rearward movement of disk 16. The units and tens of the two disks are viewed through the apertures 20 in the front of the box, exposing the space covered by a single figure on each disk.

It will be seen that six eggs can be placed upon the top or testing board 4 and inspected at the same time, and that automatically on their being so placed the disk 15 is forced forward one figure, indicating the number of eggs or the number of handfuls of eggs counted.

When a certain number of eggs have been tested and counted, the indicator may be returned to zero by rotating each disk through the medium of handles 21, projecting through the front of the box and rigid with said disks.

I am aware that it has been proposed to place a candle fixedly above and to one side of a testing-board beneath which is situated a mirror; but this is not the equivalent of my invention.

Having thus described my invention, the following is what I claim as new therein and desire to secure by Letters Patent:

1. The combination of a register or counter, a depressible testing-board having seats for the eggs, means for elevating said board after each depression and holding it normally in elevated position, and a connection between said counter and testing-board, substantially as set forth.

2. The combination, with a box or frame, a testing-board forming the top of the box, a register or counter located in the bottom of the box, and connections between said testing-board and counter, of a mirror placed removably over said counter beneath said testing-board, for the purpose set forth.

3. The combination of a register or counter, a depressible testing-board having seats for the eggs, a spring for holding said testing-board normally in elevated position, and a connection between said testing-board and counter, for the purpose set forth.

4. The combination, with a register or counter having a ratchet-wheel, a depressible testing-board having seats for the eggs, and a spring for holding said testing-board normally in elevated position, of a dog pendent from said testing-board and engaging said ratchet-wheel, as set forth.

CONRAD REUTER.

Witnesses:
R. C. SOAPER,
HENRY RUDY.